US010594837B1

(12) United States Patent
Dimascio et al.

(10) Patent No.: US 10,594,837 B1
(45) Date of Patent: Mar. 17, 2020

(54) PREDICTIVE SERVICE SCALING FOR CONVERSATIONAL COMPUTING

(71) Applicant: International Business Machines Corporation, Armonk, NY (US)

(72) Inventors: Carmine M. Dimascio, West Roxbury, MA (US); Tamer E. Abuelsaad, Armonk, NY (US); Bruce Raymond Slawson, Palmdale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/178,648

(22) Filed: Nov. 2, 2018

(51) Int. Cl.
*G06F 15/16* (2006.01)
*G01L 21/00* (2006.01)
*G06Q 30/02* (2012.01)
*H04L 29/08* (2006.01)
*G10L 15/22* (2006.01)

(52) U.S. Cl.
CPC ............ *H04L 67/327* (2013.01); *G10L 15/22* (2013.01); *H04L 67/325* (2013.01); *G10L 2015/225* (2013.01)

(58) Field of Classification Search
CPC ............... H04L 29/08072; H04L 29/06; H04L 29/0809; H04L 29/08981; H04L 67/327; H04L 67/325; G06Q 30/02; G06F 17/271; G06F 17/2705; G06F 17/2785; G06N 20/00; G06N 5/022; G10L 15/19; G10L 15/22; G10L 15/1822; G10L 25/48; G10L 2015/223; G10L 2015/225
See application file for complete search history.

(56) References Cited

U.S. PATENT DOCUMENTS

| 8,082,153 | B2 | 12/2011 | Coffman et al. |
| 8,600,757 | B2 | 12/2013 | Mazin et al. |
| 8,799,000 | B2 * | 8/2014 | Guzzoni ................. G10L 15/22 704/270.1 |

(Continued)

OTHER PUBLICATIONS

Daniel Jacobson et al., Scryer: Netflix's Predictive Auto Scaling Engine, Nov. 3, 2013.

(Continued)

*Primary Examiner* — Abdullahi E Salad
(74) *Attorney, Agent, or Firm* — Garg Law Firm, PLLC; Rakesh Garg; Joseph Petrokaitis

(57) ABSTRACT

From intent data of a conversational system, a set of intent sequences and a model predicting a next intent for an intent sequence are constructed. A first intent is received as an input. Using the model, a next intent corresponding to the first intent is predicted. A service required by the next intent is determined. A resource consumption of the service is forecasted. Responsive to the forecasted resource consumption exceeding a present resource allocation to the service, it is concluded that the service requires upscaling before becoming available for use by the next intent. An availability time by which the service is required to be available for use by the next intent is determined. An initial time at which upscaling must begin to ensure that the service is available at the availability time is determined. Upscaling of the service is caused to be scheduled for the initial time.

20 Claims, 6 Drawing Sheets

(56) References Cited

U.S. PATENT DOCUMENTS

| | | | |
|---|---|---|---|
| 2013/0046760 A1* | 2/2013 | Evans | G06Q 10/10 707/728 |
| 2013/0339021 A1* | 12/2013 | Deshmukh | G10L 15/18 704/257 |
| 2014/0337092 A1* | 11/2014 | Patel | G06Q 30/0201 705/7.29 |
| 2016/0171424 A1* | 6/2016 | Kannan | G06Q 10/063118 705/7.17 |
| 2016/0378760 A1* | 12/2016 | Braz | G06Q 50/01 707/728 |
| 2018/0024994 A1* | 1/2018 | Sarikaya | G06F 16/3322 704/9 |
| 2018/0174055 A1* | 6/2018 | Tirumale | G06N 5/02 |
| 2018/0233141 A1* | 8/2018 | Solomon | A61B 5/117 |
| 2019/0043483 A1* | 2/2019 | Chakraborty | G10L 15/063 |
| 2019/0088254 A1* | 3/2019 | Filar | G10L 15/1815 |

OTHER PUBLICATIONS

Zhenhuan Gong et al., Press: Predictive Elastic ReSource Scaling for cloud systems, CNSM 2010.

Elastisys, Predictive Auto-Scaling in Elastisys Cloud Platform, Apr. 8, 2015.

Nilabja Roy et al., Efficient Autoscaling in the Cloud using Predictive Models for Workload Forecasting, Jul. 2011.

Mahesh Balaji et al., Predictive Cloud Resource Management Framework for Enterprise Workloads, Journal of King Saud University—Computer and Information Sciences vol. 30, Issue 3, Jul. 2018, pp. 404-415.

Rui Han et al., Lightweight Resource Scaling for Cloud Applications, 2012.

Qazi Zia Ullah et al., Adaptive Resource Utilization Prediction System for Infrastructure as a Service Cloud, Dec. 31, 2016.

* cited by examiner

PREDICTIVE SERVICE SCALING FOR CONVERSATIONAL COMPUTING

TECHNICAL FIELD

The present invention relates generally to a method, system, and computer program product for services supporting a human-machine interface. More particularly, the present invention relates to a method, system, and computer program product for predictive service scaling for conversational computing.

BACKGROUND

Conversational computing is a style of human-computer interaction in which users interact with computer programs through commands and responses in a natural language. A natural language is a scripted (written) or a vocalized (spoken) language having a form that is employed by humans for primarily communicating with other humans or with systems having a natural language interface. While a user often interacts with such systems by voice, other input methods, such as typing into a chat application or text supplied from a speech-to-text application, are also available. Other output methods, such as text—for example, in responses in a chat application—are available as well.

For example, digital assistant programs such as IBM's Watson Assistant, Amazon's Alexa, Microsoft's Cortana, Google's Assistant, and Apple's Siri use conversational computing to respond to voice commands to handle various tasks. (IBM and IBM Watson are trademarks of International Business Machines Corporation in the United States and in other countries. Alexa is a trademark of Amazon.com, Inc. or its affiliates in the United States and in other countries. Cortana is a trademark of Microsoft Corporation in the United States and in other countries. Google Assistant is a trademark of Google Inc. in the United States and in other countries. Siri is a trademark of Apple Inc. in the United States and in other countries.)

Conversational computing systems typically use a library of skills, where each skill is a module that includes an associated vocabulary and some computer-implemented functionality based on that vocabulary. For example, a clock skill might include vocabulary enabling the skill to recognize voice commands such as "what time is it?" and the functionality to search for current time and respond to the user with the current time.

To begin interacting with a skill, a user generally must say a phrase. The phrase acts as a command, causing the conversational system to perform an action. For example, a user might say, "What time is it?" to have the conversational system say the current time. Similarly, a user might say, "Remind me to get milk next time I'm near a supermarket" to have the conversational system add an appropriate reminder to a reminder application and report this status to the user.

SUMMARY

The illustrative embodiments provide a method, system, and computer program product. An embodiment includes a method that constructs, from intent data of a conversational system, a set of intent sequences. An embodiment constructs, from the set of intent sequences, a model, wherein the model predicts a next intent for an intent sequence. An embodiment receives, as an input, a first intent. An embodiment predicts, using the model, a next intent corresponding to the first intent. An embodiment determines a service required by the next intent. An embodiment forecasts a resource consumption of the service. An embodiment concludes, responsive to the forecasted resource consumption exceeding a present resource allocation to the service, that the service requires upscaling before becoming available for use by the next intent. An embodiment determines an availability time by which the service is required to be available for use by the next intent. An embodiment determines an initial time at which upscaling must begin to ensure that the service is available at the availability time. An embodiment causes to be scheduled, for the initial time, upscaling of the service An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
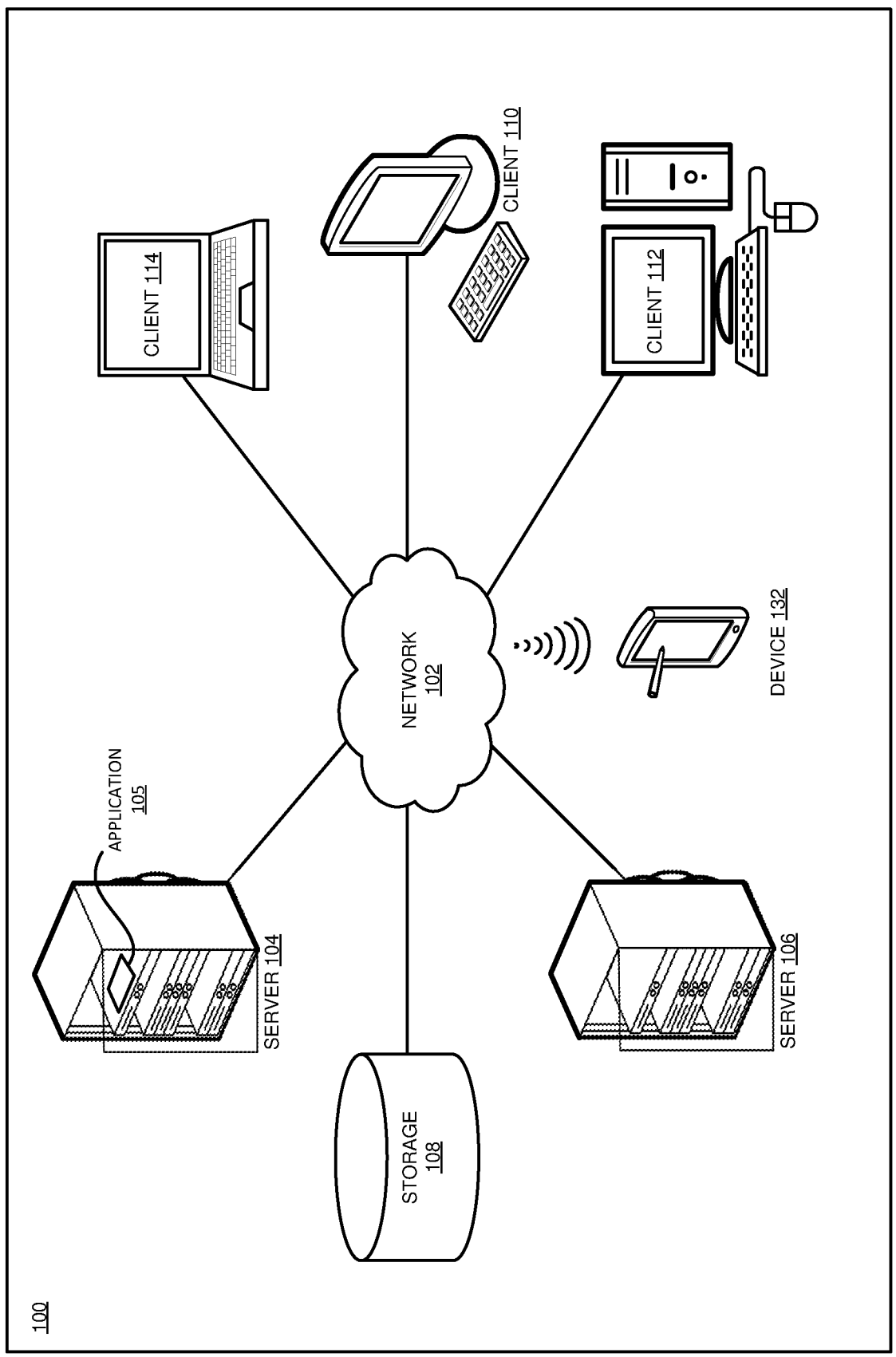
FIG. 1 depicts a block diagram of a network of data processing systems in which illustrative embodiments may be implemented.

Conversational systems often require one or more services to support skills within the conversational system. For example, a conversational system might include a clock skill, supported by a clock service, to process user requests related to time. The conversational system might also include a shopping skill to process shopping-related tasks, perhaps as the front end to an ecommerce implementation. The shopping skill might include a service maintaining a catalog of items available for purchase, another service to handle item pricing, and a third service supporting product recommendations for a particular user—or the shopping skill might be implemented using one larger service to handle the catalog, item pricing, and recommendations, as well as other related tasks.

Such services, like other computing resources, take time to initialize and become available to skills and hence, users. Scale-up times for services may range from milliseconds to as much as a minute or two, depending on the required computing resources.

Further, needs for services may change over time. For example, a conversational system in listening mode, waiting for a user to say something, does not use many services. Once a user is actually interacting with a conversational system, additional services will be needed to interpret and execute the user's commands. Such resources may include additional memory (for example, to hold a large item catalog), processors (for example, to determine a user-specific recommendation), storage (for example, to hold a local copy of a database to be referenced in determining user-specific recommendations), or any other resources needed to support a particular skill or skill subset.

The illustrative embodiments recognize that current conversational systems begin scaling up services reactively, once an application determines that such services are required. Long scale-up times lengthen the response time of a conversational system. Response times that are longer than users expect contribute to a poor user experience, especially when users are not in a position to know the cause of any response delay. Thus, the illustrative embodiments recognize that a need exists for reducing response times.

The illustrative embodiments recognize that the presently available tools or solutions do not address these needs or provide adequate solutions for these needs. The illustrative embodiments used to describe the invention generally address and solve the above-described problems and other problems related to predictive service scaling for conversational computing.

An embodiment can be implemented as a software application. The application implementing an embodiment can be configured as a modification of an existing conversational computing system, as a separate application that operates in conjunction with an existing conversational computing system, a standalone application, or some combination thereof.

Particularly, some illustrative embodiments provide a method by which near-future service usage can be predicted, so that needed services can be upscaled in time for usage when required.

In conversational systems, each skill comprises a list of utterances, each mapping to an intent, optional slot(s), and an action. An utterance is a phrase. While a user typically speaks an utterance, other input methods, such as typing into a chat application or text supplied from a speech-to-text application, are also possible.

An intent is something the user wants to accomplish from the utterance. Once a conversational system detects an utterance, the device maps the utterance to an intent. For example, the utterance, "What time is it?" might map to an intent of "get time", where "get time" is an example conversational system's intent meaning that user wants the current time.

Multiple utterances may map to one intent. For example, the utterances, "Tell me the time", "Get time", and "What time is it?" could all map to the "get time" intent in an example conversational system.

A slot is a placeholder or variable, having a value, extracted from an utterance. For example, for the utterance, "set a timer for ten minutes from now", the intent could be "set a timer" and the slot value could be "ten minutes from now". As another example, given the utterance, "tell me about Mars," the intent could be "tell me" and the slot value could be "about Mars".

An action is code that executes to perform a request denoted by a particular intent and slot value. For example, for the utterance, "set a timer for ten minutes from now", the action could be to set a timer that expires ten minutes after the current time and report this back to the user. An action may be simple, such as setting a timer, or more complex, such as triggering a piece of business logic to perform a task.

A turn comprises an utterance and a conversational system's response to the utterance. For example, the utterance, "What time is it?" and the response, "It's 2:44 PM", taken together, are one turn. Conversations often include multiple turns. For example, the utterance, "What time is my flight today?" the response, "Flight 1234 is scheduled to leave at 2:44 PM", followed by the utterance, "Remind me when it's time to leave for the airport. I want to be there an hour before flight time," and the response, "I've set that reminder" together constitute two turns. A conversation includes one or more turns.

An embodiment analyzes sequences of intents, already determined (for example, by existing techniques implemented in a conversational system) from user utterances, to construct a model that predicts a next intent or a next sequence of intents. An embodiment may collect such sequences in real-time, as users interact with a conversational system, or from historical data.

Consider the exemplary sequence:
Turn 1: u1, i1
Turn 2: u2, i1
Turn 3: u3, i2
Turn 4: u4, i3

Here, u symbolizes an utterance, and i symbolizes a corresponding intent. For example, u1 could be, "Hello" and the corresponding i1 could be "wakeup"—an intent that produces the response, "How can I help you?" U2 could be, "Hi, there" which also maps to i1, the "wakeup" intent. U3 could be, "What time is my flight today?" corresponding to an i3 of "calendar", and u4 could be "Remind me when it's time to leave for the airport. I want to be there an hour before flight time," with a corresponding i3 of "reminder".

For each sequence of intents, an embodiment generates subsequences of one or more turns, each mapped to a corresponding next intent. Thus, from the exemplary sequence discussed above, and using the notation $f(X) \rightarrow y$ (where $f(\ )$ denotes a function, X denotes an array of intents and y denotes the next intent), all of the subsequences would be:

$f(i1) \rightarrow i1$
$f(i1, i1) \rightarrow i2$
$f(i1) \rightarrow i2$
$f(i1, i1, i2) \rightarrow i3$
$f(i1, i2) \rightarrow i3$
$f(i2) \rightarrow i3$ Thus, for example, because utterance u2 follows utterance u1, and both u1 and u2 correspond to intent i1, $f(i1) \rightarrow i1$ means that in proceeding from turn 1 to turn 2 i1 will follow a previous i1. Similarly, $f(i1, i1, i2) \rightarrow i3$ means that in for the conversational sequence turn 1, turn 2, turn 3, and turn 4, the next intent (in turn 4) is i3.

An embodiment uses the collected intent sequences to construct a model that receives an intent sequence as an input, and outputs a predicted next intent corresponding to the intent sequence. An embodiment constructs a prediction model using any suitable technique, for example one or more machine learning techniques. Such a model determines that, given the exemplary intent sequence i1 followed by another i1, i2 will occur with probability p1, while i3 will occur with a probability p2. For example, if i1 denotes the wakeup intent, i2 denotes the calendar intent, and i3 denotes the reminder intent, p1 might be 0.3, reflecting a 30 percent probability that a user will follow two wakeup intents with a calendar intent, while p2 might be 0.1, reflecting a 10 percent probability that a user will follow two wakeup intents with a reminder intent.

An embodiment monitors conversations with a conversational system to predict an intent corresponding to a user's next utterance. For example, if the user has made two utterances in a row that both map to the wakeup intent, and the model predicts a 60 percent probability that a user will follow two wakeup intents with a calendar intent and a 10 percent probability that a user will follow two wakeup intents with a reminder intent, and all the other predicted intents are below 2 percent, an embodiment could use the model to predict that the user's next utterance will map to a calendar intent.

An embodiment also uses such a model to predict an intent more than one conversational turn ahead, by invoking the model recursively. For example, if the predict ( ) function in software code returns a prediction of the next turn with an accompanying probability, then the call predict([i1, i2, i3]) returns a prediction of the next intent after the sequence i1, i2, i3, and the call predict (predict([i1, i2, i3])) returns a prediction of the next two intents after the sequence i1, i2, i3.

Such predictions make use of the observation that conversations with conversational systems often fall into patterns. For example, on one day a user might ask, "What's today's weather?", receive a response of "80 percent chance of rain", and then say, "Remind me to take my umbrella when I leave the house." On another day a user might ask, "What's today's weather?", receive a response of "It's going to snow all day", and then say, "Remind me to wear snow boots when I leave the house." On a third day a user might ask, "What's today's weather?", receive a response of "It's going to be sunny with a high of 95 degrees", and then say, "Remind me to put on extra sunscreen before I leave the house." In each case, an utterance corresponding to a weather intent is followed by an utterance corresponding to a reminder intent.

An embodiment maps each intent to one or more services the intent requires. For example, a time intent might only require one service, while a shopping intent might require a service supporting an item catalog, a second service supporting pricing information, and a third service supporting a recommendation engine. Such mappings can be supplied to an embodiment, for example as compiled by a human analyst, system administrator, or software designer. Another embodiment learns mappings, for example using known machine learning or pattern recognition techniques. For example, an embodiment might observe that whenever a shopping intent is being processed, a service supporting an item catalog, a second service supporting pricing information, and a third service supporting a recommendation engine are all utilized. Thus, such an embodiment learns that the shopping intent, denoted as i1, maps to services s1, s2, and s3.

An embodiment is configurable to apply rules governing how both intent and associated service predictions should be determined, and how many and which predictions should be used. In addition, an embodiment uses one rule or a combination of rules together. For example, one rule might be that the model returns the most probable predicted intent, or the most probable predicted intent that is also above a confidence threshold. For example, if the most probable predicted intent only has a 25 percent probability of occurring, such a prediction is not likely to be sufficiently dependable and should be discarded.

Another rule might be that the model returns all or a subset of the most probable predicted intents that are also above a confidence threshold. For example, a model might determine that there are two predicted intents, each having a 50 percent probability of occurring, and the rest of the predicted intents have probabilities of occurring below 5 percent. In such a case, a model might return both of the top two predicted intents, optionally along with accompanying probabilities. Such information informs predictions of intents that are multiple turns ahead. For example, a conversation might proceed in either of two equally probable directions, corresponding to two equally probable next intents, but in either case end up with the same predicted intent three turns further in the future.

Another rule might govern how many turns ahead a model should predict, based on the determined reliability of predictions fewer turns ahead. For example, if the intent predicted for three turns ahead has a probability value below a threshold, or a probability value lower than a probability value associated with an intent projected for two turns ahead, the model should discard the three-turn prediction, and only predict two turns ahead.

Another rule might be to predict as many turns ahead as possible, and return the intent sequence with the highest probability. For example, if a conversation is predicted to branch in two directions, but then return to a common intent, associated probabilities for each of the two directions might each be 30 percent, but the probability for the final common intent might be 80 percent. Thus, a model given this scenario as an input might not return a predicted intent falling within either of the two shorter sequences (with probabilities of 30 percent), but would return the final common intent because it has an 80 percent probability.

Another rule might be to assign different minimum probability thresholds for different numbers of future turns. For example, a prediction for one turn ahead might be deemed sufficiently reliable if above an 80 percent probability, while a prediction for two turns ahead might be deemed sufficiently reliable if above an 50 percent probability, and a prediction for three turns ahead might be deemed sufficiently reliable if above an 20 percent probability.

Another rule might involve predicting services instead of intents. For example, such a rule could be that if the same service or set of services is associated with multiple predicted intents, that service should be predicted. Such a service prediction could be made in combination of one or more intent probability thresholds, or overriding one on more thresholds. For example, if the same service appears in 4 out of 5 of the predicted intents, that service is very likely to be needed no matter which intent actually occurs.

As well, other rules are possible and contemplated within the scope of the illustrative embodiments. Such rules may also be generated and configured by humans, an embodiment utilizing machine learning or other known techniques, or a combination of human and machine input.

As a conversation continues, an embodiment continues to monitor turns and predict services that are likely, based on the rules and thresholds discussed, to be needed one or more turns in the future. An embodiment converts numbers of turns to estimated times, to determine when in time each service will need to be available. Thus, if an embodiment predicts 3 turns ahead for a given user and conversation, the current time is t0, and each turn takes 1 time unit (such as a particular number of seconds), the next turn will occur at time t0+1 time unit, the turn after the next turn will occur at time t0+2 time units, and the turn after that will occur at time t0+3 time units. Thus, if service s1 is predicted to be needed in the next turn, s1 will be needed at time t0+1 time unit. Similar, if services s2 and s3 are predicted to be needed in 3 turns, s2 and s3 will be needed at time t0+3 time units.

An embodiment converts numbers of turns to estimated times using any suitable rule. An embodiment is configurable to use a fixed conversion—for example, each turn takes three seconds. Another embodiment computes a conversion using the current user's current conversation history. For example, if in this session a user responds to outputs from the conversational system with a mean response time of 5 seconds, with a standard deviation of 1 second longer and shorter, each turn takes 5 seconds. Another embodiment computes a conversion using the current user's historical conversation history. For example, if in all of the user's sessions a user responds to outputs from the conversational system with a mean response time of 4 seconds, with a standard deviation of 1 second longer and shorter, each turn takes 4 seconds. Another embodiment computes a conversion using all users' conversation histories.

Another embodiment computes a conversion based on a determined complexity level of the conversation, or a determined complexity level of a topic of the conversation. An embodiment can determine both topic and complexity level using any suitable technique, for example Natural Language Processing (NLP), or based on a skill processing the current conversation. For example, when asking about weather, a user might respond quickly with a follow-up question. On the other hand, when interaction with a shopping skill, a user might take longer to consider various purchase options and respond more slowly. As well, other means of converting numbers of turns to estimated times are possible and contemplated within the scope of the illustrative embodiments.

Once an embodiment has predicted when, in time, particular services are needed, the embodiment can schedule each such service for scaling up. Many services require time from the initiation of upscaling until they are available for use. Such delays may be due to a necessity to copy a database from a remote server to local storage, load data from local storage into memory, configure and initialize a new processor or virtual machine, or other such computing resource additions. For example, if service s1 is not running right now, will be needed in 5 seconds, and takes 2 seconds to become fully operational, service s1 should be scheduled to start scaling up in 3 seconds from now. Similarly, if service s2 is not running right now, will be needed in 2 seconds, but takes only 0.5 seconds to become fully operational, service s2 should be scheduled to start scaling up in 1.5 seconds from now.

An embodiment causes services scheduled for upscaling to be upscaled at the scheduled times. For example, if service s1 is scheduled to start upscaling in 3 seconds from now, once the 3 seconds have elapsed the embodiment causes service s1 to begin upscaling. An embodiment causes upscaling, as well as mechanisms for initiating upscaling at a particular time, using any suitable known technique. For example, data centers routinely add additional computing resources such as additional memories, processors, or virtual machines as computing needs change.

An embodiment is concerned with predicting needed services to accomplish upscaling by the time the services will be needed. Downscaling, or taking services offline once they are no longer needed, may be accomplished based on actual traffic, using any suitable technique.

An embodiment may encounter a conflict between a predicted need for upscaling and an actual need for downscaling. For example, a service may not have been used for several minutes, so is a candidate for downscaling. However, the same service is predicted to be needed in the next 5 seconds. In such a case the service could be downscaled and the upscaled again, or the downscaling could be canceled or delayed until the service is once again not needed. Alternatively, an embodiment can be configured to use one or more conflict resolution rules governing whether downscaling should occur or be delayed, based on costs and efficiencies associated with brining the relevant resources offline and online. Such rules can be configured based on the specific resource needs of the individual services.

The manner of predictive service scaling for conversational computing described herein is unavailable in the presently available methods. A method of an embodiment described herein, when implemented to execute on a device or data processing system, comprises substantial advancement of the functionality of that device or data processing system in predicting which services are likely to be required at which times, based on previous conversational patterns, and upscaling the needed services so they are available when needed.

The illustrative embodiments are described with respect to certain types of conversational systems, natural languages, skills, utterances, intents, services, turns, computing resources, delays, periods, forecasts, thresholds, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
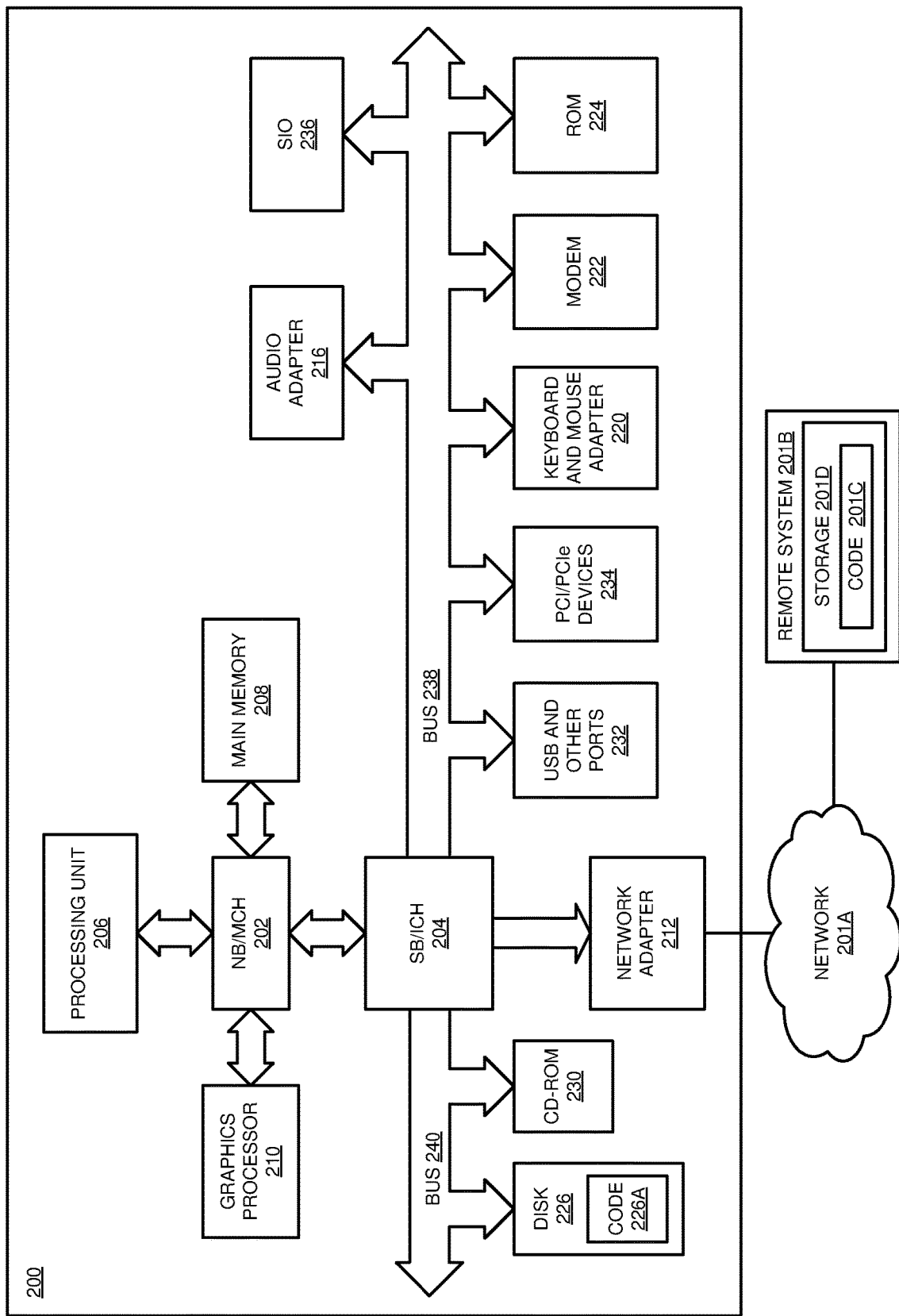
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. User 134 may interact with application 105 using device 132 or clients 110, 112, and 114 to say, type, or otherwise provide utterances to application 105 and receive responses to the utterances.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
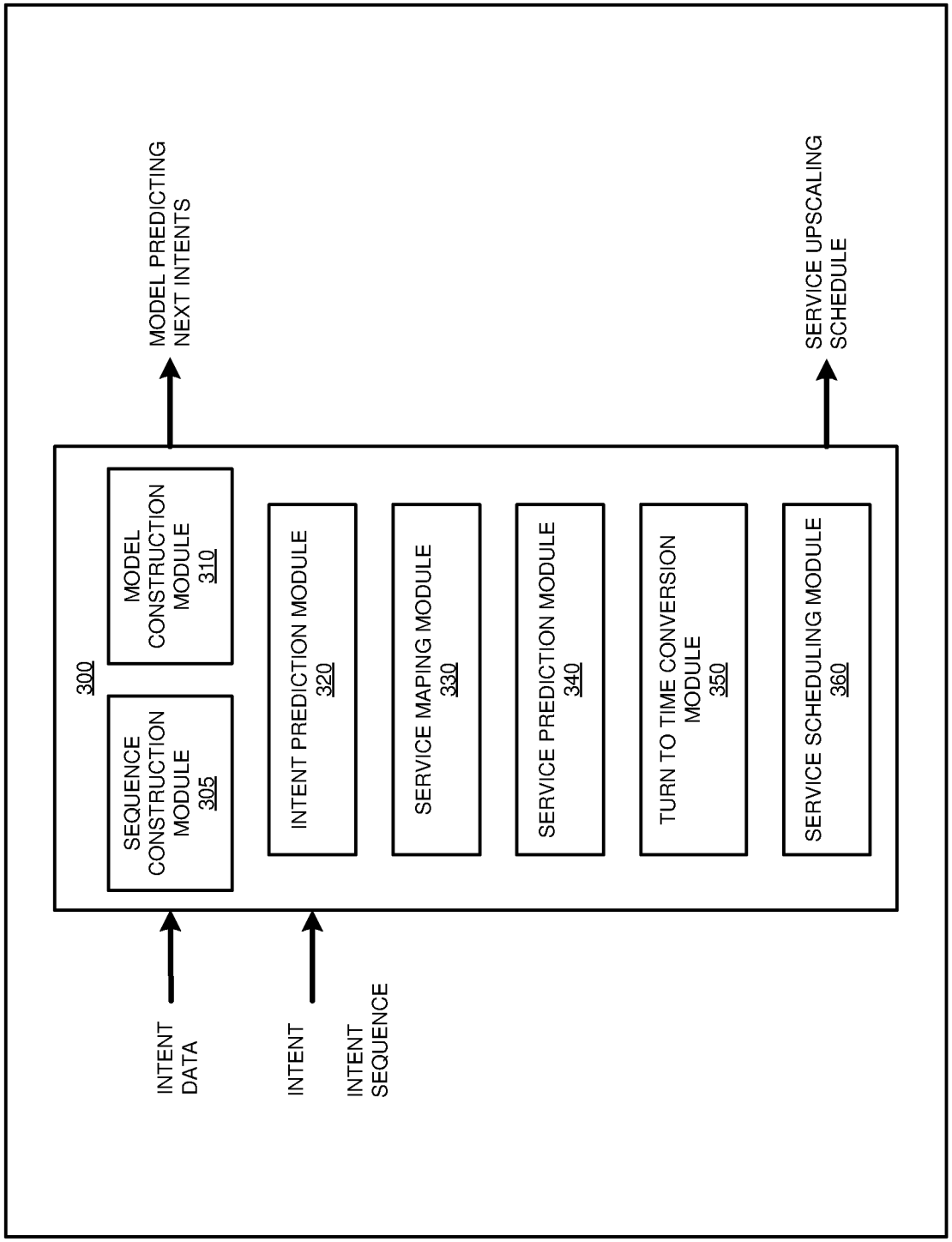
FIG. 3 depicts a block diagram of an example configuration for predictive service scaling for conversational computing in accordance with an illustrative embodiment.

With reference to FIG. 3, this figure depicts a block diagram of an example configuration for predictive service scaling for conversational computing in accordance with an illustrative embodiment. Application 300 is an example of application 105 in FIG. 1 and executes in server 104 in FIG. 1.

Sequence construction module 305 constructs a set of sequences determined from user utterances in a conversational system. Model construction module 310 analyzes the constructed intent sequences to construct a model that predicts a next intent or a next sequence of intents. Such sequences may have been collected in real-time, as users interact with a conversational system, or from historical data. Model construction module 310 predicts that given a particular intent or sequence of intents, a later intent or sequence of intents will occur with a particular probability value.

Intent prediction module 320 monitors conversations with a conversational system to predict one or more intents corresponding to a user's next utterance, each with a corresponding probability value corresponding to a likelihood that a predicted intent is correct. To produce a prediction, intent prediction module 320 applies an intent or an intent sequence to the model constructed by model construction module 310. Application 300 can also utilize intent prediction module 320 to predict intents more than one turn ahead, by utilizing intent prediction module 320 in a recursive manner.

Service mapping module 340 maps each predicted intent to one or more services the intent requires. Such mappings can be supplied to service mapping module 340, for example as compiled by a human analyst, system administrator, or software designer. Alternatively, service mapping module 340 learns mappings, for example using known machine learning or pattern recognition techniques.

Service prediction module 340 applies rules governing how both intent and associated service predictions should be determined and how many and which predictions should be used. Such rules can be based on intent probabilities, service probabilities, or a combination of intent and service probabilities. As well, such rules may predict intents and services one or multiple turns ahead. Using the rules, service prediction module 340 predicts services that are likely to be needed one or more turns in the future.

Turn to time conversion module 350 converts numbers of turns to estimated times using any suitable rule, such as a constant, a current user's current or historical conversational history, all users' conversational histories, or a complexity level of a conversation or a topic of conversation.

Once turn to time conversion module 350 has predicted when, in time, particular services are needed, service scheduling module 360 can schedule each such service for scaling up. Once services are scheduled, application 300 causes scheduled services to be upscaled at the scheduled times. Further, service scheduling module 360 resolves conflicts between services that are both predicted to be upscaled and candidates for downscaling due to current low usage levels.

Figure 4:
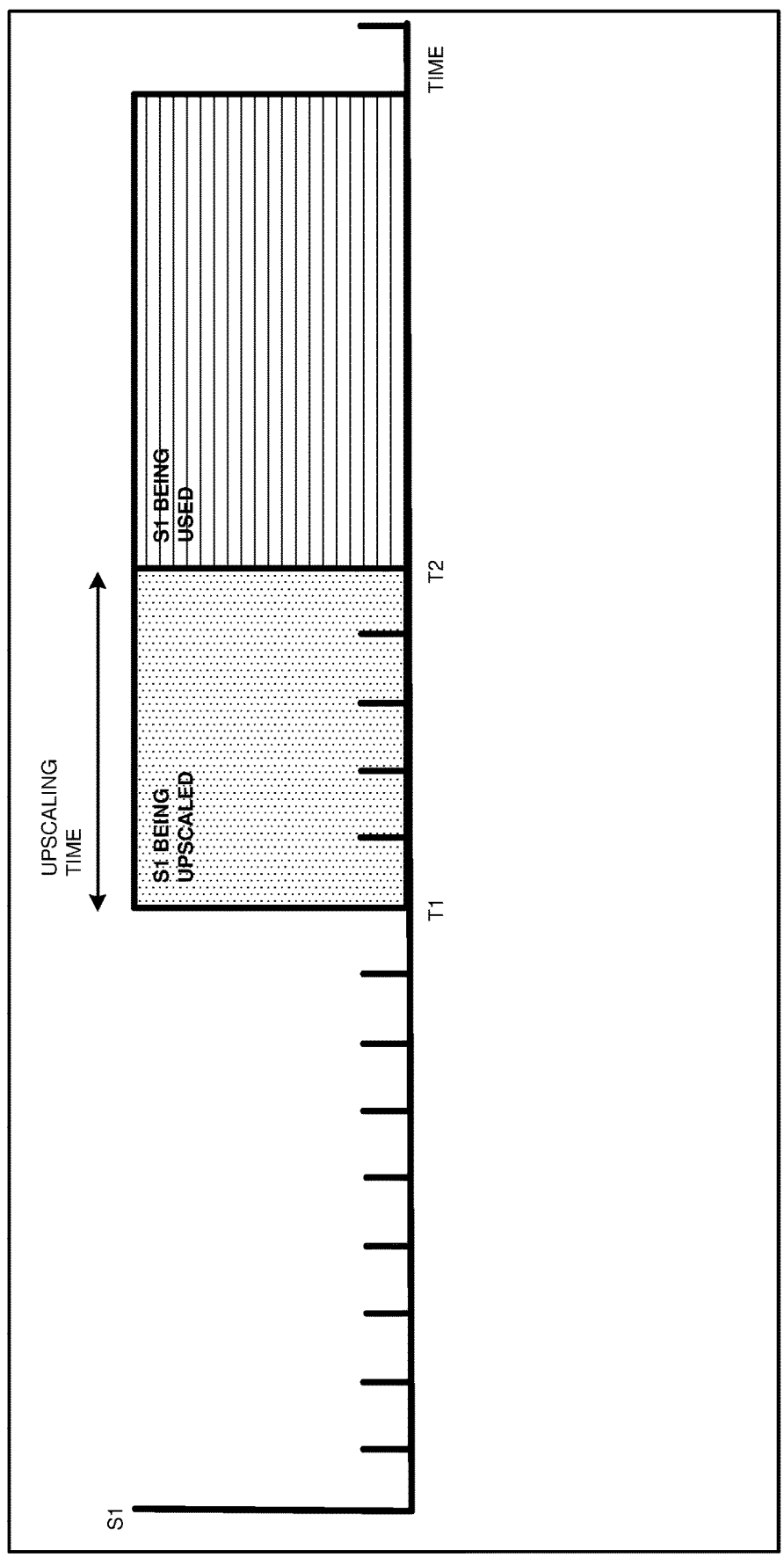
FIG. 4 depicts an example of scheduling a service to be upscaled, in accordance with an illustrative embodiment.

With reference to FIG. 4, this figure depicts an example of scheduling a service to be upscaled, in accordance with an illustrative embodiment. The concepts illustrated in FIG. 4 can be implemented in application 300 in FIG. 3.

In FIG. 4, application 300 has predicted that a service, here denoted by s1, will be needed for use at time t2. However, service s1 is not running right now and requires 6 units of time to become fully operational. Hence application 300 should schedule service s1 to start scaling up at time t1, 6 units of time before service s1 is needed at time t2.

Figure 5:
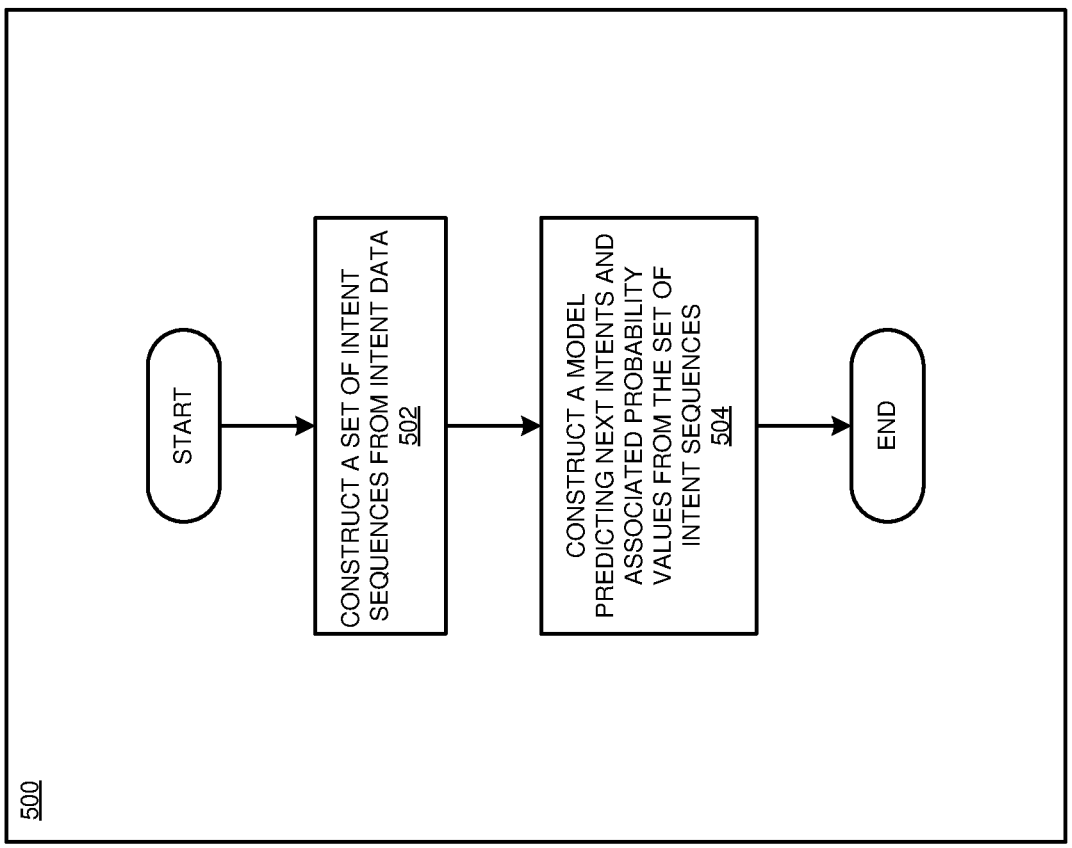
FIG. 5 depicts a flowchart of an example process for the model construction portion of predictive service scaling for conversational computing in accordance with an illustrative embodiment.

With reference to FIG. 5, this figure depicts a flowchart of an example process for the model construction portion of predictive service scaling for conversational computing in accordance with an illustrative embodiment. Process 500 can be implemented in application 300 in FIG. 3.

In block 502, the application constructs a set of intent sequences from intent data of a conversational system. In block 504, the application constructs a model predicting next intents and associated probability values from the set of intent sequences. Then the application ends.

Figure 6:
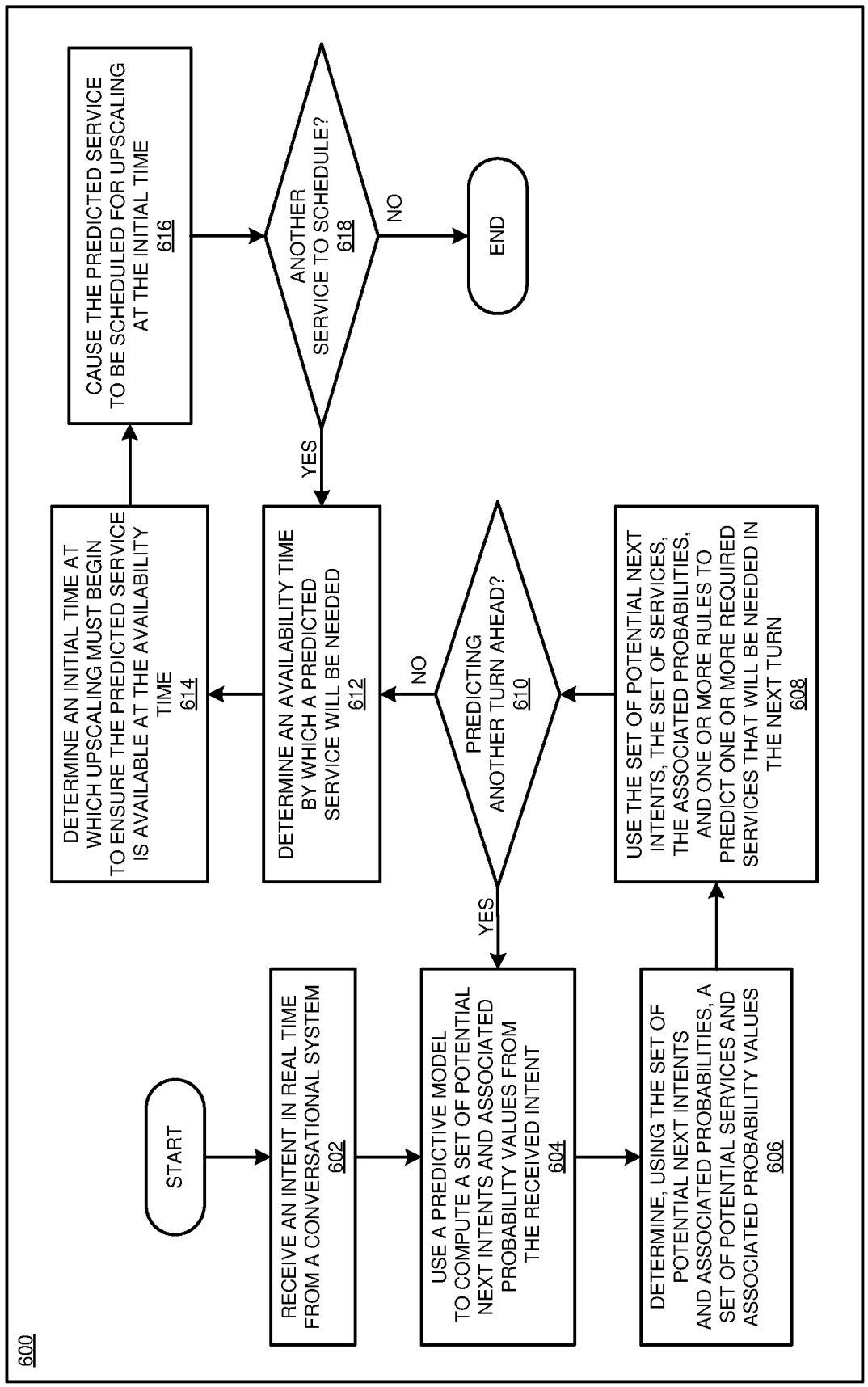
FIG. 6 depicts a flowchart of an example process for predictive service scaling for conversational computing in accordance with an illustrative embodiment.

With reference to FIG. 6, this figure depicts a flowchart of an example process for predictive service scaling for conversational computing in accordance with an illustrative embodiment. Process 600 can be implemented in application 300 in FIG. 3.

In block 602, the application receives an intent, in real time, from a conversational system. In block 604, the application uses a predictive model to compute a set of potential next intents and associated probability values from the received intent. In block 606, the application determines, using the set of potential next intents and associated intent probability values a set of potential services and associated service probability values. In block 608, the application uses the set of potential next intents, the set of potential services, the associated probabilities for each set, and one or more rules to predict one or more required services that will be needed in the next turn. In block 610, the application determines whether predicting another turn ahead is needed. If yes ("YES" path of block 610), the application returns to block 604 to begin the prediction process. If not ("NO" block of block 610), in block 612 the application determines an availability time by which a predicted service will be needed. In block 614, the application determines an initial time at which upscaling must begin to ensure the predicted service is available at the availability time. In block 616, the application causes the predicted service to be scheduled for upscaling at the initial time. In block 618, the application determines whether another service requires scheduling. If yes ("YES" path of block 618), the application returns to block 612. If not, the application ends.

Thus, a computer implemented method, system or apparatus, and computer program product are provided in the illustrative embodiments for predictive service scaling for conversational computing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
constructing, from intent data of a conversational system, a set of intent sequences;
constructing, from the set of intent sequences, a model, wherein the model predicts a next intent for an intent sequence;
receiving, as an input, a first intent;
predicting, using the model, a next intent corresponding to the first intent;
determining a service required by the next intent;
forecasting a resource consumption of the service;
concluding, responsive to the forecasted resource consumption exceeding a present resource allocation to the service, that the service requires upscaling before becoming available for use by the next intent;
determining an availability time by which the service is required to be available for use by the next intent;
determining an initial time at which upscaling must begin to ensure that the service is available at the availability time; and
causing to be scheduled, for the initial time, upscaling of the service.

2. The method of claim 1, wherein predicting a next intent comprises:
computing, using the model, a set of potential next intents and corresponding probability values, wherein each probability value comprises a probability that a potential next intent will occur; and
determining, as the next intent, the potential next intent associated with the highest probability value.

3. The method of claim 1, wherein predicting a next intent comprises:
computing, using the model, a set of potential next intents and corresponding probability values, wherein each probability value comprises a probability that a potential next intent will occur; and
determining, as the next intent, the potential next intent associated with the highest probability value, the highest probability value being above a threshold probability value.

4. The method of claim 1, wherein predicting a next intent comprises:
computing, using the model, a set of potential next intents and corresponding probability values, wherein each probability value comprises a probability that a potential next intent will occur; and
determining, as the next intent, all potential next intent associated with highest probability values above a threshold probability value.

5. The method of claim 1, further comprising;
predicting, using the model, a second next intent corresponding to the first intent and predicted to occur after the next intent is predicted to occur;
determining a second service required by the second next intent, the second service requiring upscaling before becoming available for use by the second next intent;
determining a second availability time by which the second service is required to be available for use by the second next intent;
determining a second initial time at which upscaling must begin to ensure that the second service is available at the second availability time; and
causing to be scheduled, for the second initial time, upscaling of the second service.

6. The method of claim 5, wherein predicting a second next intent comprises:
computing, using the model, a set of potential second next intents and corresponding probability values, wherein each probability value comprises a probability that a potential second next intent will occur; and
determining, as the second next intent, the potential second next intent associated with the highest probability value, provided the highest probability value is higher than a probability value associated with the next intent.

7. The method of claim 5, wherein predicting a second next intent comprises:
computing, using the model, a set of potential second next intents and corresponding probability values, wherein each probability value comprises a probability that a potential second next intent will occur;
determining that no potential second next intent is associated with a probability value higher than a probability value associated with the next intent; and
declining, in response to the determining, to predict a second next intent.

8. The method of claim 1, wherein determining a service required by the next intent comprises:
computing, using the model, a set of potential next intents and corresponding intent probability values, wherein each intent probability value comprises a probability that a potential next intent will occur;
determining, using the set of potential next intents and corresponding intent probability values, a set of potential services and corresponding service probability values, wherein each service probability value comprises a probability that a potential service will be required; and
determining, as the service, the potential service associated with the highest service probability value.

9. The method of claim 1, wherein determining an availability time comprises:
predicting a number of turns in which the next intent will be received;
converting the number of turns to a time period; and
adding, resulting in the availability time, the time period to the current time.

10. A computer usable program product comprising one or more computer-readable storage devices, and program instructions stored on at least one of the one or more storage devices, the stored program instructions comprising:
program instructions to construct, from intent data of a conversational system, a set of intent sequences;
program instructions to construct, from the set of intent sequences, a model, wherein the model predicts a next intent for an intent sequence;
program instructions to receive, in real time, a first intent;
program instructions to predict, using the model, a next intent corresponding to the first intent;
program instructions to determine a service required by the next intent;
program instructions to forecast a resource consumption of the service;
program instructions to conclude, responsive to the forecasted resource consumption exceeding a present resource allocation to the service, that the service requires upscaling before becoming available for use by the next intent;
program instructions to determine an availability time by which the service is required to be available for use by the next intent;
program instructions to determine an initial time at which upscaling must begin to ensure that the service is available at the availability time; and
program instructions to cause to be scheduled, for the initial time, upscaling of the service.

11. The computer usable program product of claim 10, wherein program instructions to predict a next intent comprises:
program instructions to compute, using the model, a set of potential next intents and corresponding probability values, wherein each probability value comprises a probability that a potential next intent will occur; and
program instructions to determine, as the next intent, the potential next intent associated with the highest probability value.

12. The computer usable program product of claim 10, wherein program instructions to predict a next intent comprises:
program instructions to compute, using the model, a set of potential next intents and corresponding probability values, wherein each probability value comprises a probability that a potential next intent will occur; and
program instructions to determine, as the next intent, the potential next intent associated with the highest probability value, the highest probability value being above a threshold probability value.

13. The computer usable program product of claim 10, wherein program instructions to predict a next intent comprises:
   program instructions to compute, using the model, a set of potential next intents and corresponding probability values, wherein each probability value comprises a probability that a potential next intent will occur; and
   program instructions to determine, as the next intent, all potential next intent associated with highest probability values above a threshold probability value.

14. The computer usable program product of claim 10, further comprising:
   program instructions to predict, using the model, a second next intent corresponding to the first intent and predicted to occur after the next intent is predicted to occur;
   program instructions to determine a second service required by the second next intent, the second service requiring upscaling before becoming available for use by the second next intent;
   program instructions to determine a second availability time by which the second service is required to be available for use by the second next intent;
   program instructions to determine a second initial time at which upscaling must begin to ensure that the second service is available at the second availability time; and
   program instructions to cause to be scheduled, for the second initial time, upscaling of the second service.

15. The computer usable program product of claim 14, wherein program instructions to predict a second next intent comprises:
   program instructions to compute, using the model, a set of potential second next intents and corresponding probability values, wherein each probability value comprises a probability that a potential second next intent will occur; and
   program instructions to determine, as the second next intent, the potential second next intent associated with the highest probability value, provided the highest probability value is higher than a probability value associated with the next intent.

16. The computer usable program product of claim 14, wherein program instructions to predict a second next intent comprises:
   program instructions to compute, using the model, a set of potential second next intents and corresponding probability values, wherein each probability value comprises a probability that a potential second next intent will occur;
   program instructions to determine that no potential second next intent is associated with a probability value higher than a probability value associated with the next intent; and
   program instructions to decline, in response to the determining, to predict a second next intent.

17. The computer usable program product of claim 10, wherein program instructions to determine a service required by the next intent comprises:
   program instructions to compute, using the model, a set of potential next intents and corresponding intent probability values, wherein each intent probability value comprises a probability that a potential next intent will occur;
   program instructions to determine, using the set of potential next intents and corresponding intent probability values, a set of potential services and corresponding service probability values, wherein each service probability value comprises a probability that a potential service will be required; and
   program instructions to determine, as the service, the potential service associated with the highest service probability value.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to construct, from intent data of a conversational system, a set of intent sequences;
   program instructions to construct, from the set of intent sequences, a model, wherein the model predicts a next intent for an intent sequence;
   program instructions to receive, in real time, a first intent;
   program instructions to predict, using the model, a next intent corresponding to the first intent;
   program instructions to determine a service required by the next intent;
   program instructions to forecast a resource consumption of the service;
   program instructions to conclude, responsive to the forecasted resource consumption exceeding a present resource allocation to the service, that the service requires upscaling before becoming available for use by the next intent;
   program instructions to determine an availability time by which the service is required to be available for use by the next intent;
   program instructions to determine an initial time at which upscaling must begin to ensure that the service is available at the availability time; and
   program instructions to cause to be scheduled, for the initial time, upscaling of the service.

* * * * *